US007681148B2

(12) United States Patent
Robinson

(10) Patent No.: US 7,681,148 B2
(45) Date of Patent: Mar. 16, 2010

(54) METHOD FOR ENABLING EASE OF USE WITH PAGE EXCEPTION PROGRAMMING

(75) Inventor: David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 711 days.

(21) Appl. No.: 11/297,486

(22) Filed: Dec. 9, 2005

(65) Prior Publication Data

US 2007/0133032 A1 Jun. 14, 2007

(51) Int. Cl.
*G06F 3/048* (2006.01)

(52) U.S. Cl. ...................................................... 715/837

(58) Field of Classification Search ................. 715/835, 715/771, 810, 825, 837

See application file for complete search history.

(56) References Cited

U.S. PATENT DOCUMENTS

2001/0044868 A1* 11/2001 Roztocil et al. ............. 710/129
2005/0152000 A1* 7/2005 Van de Capelle et al. .. 358/1.18

* cited by examiner

*Primary Examiner*—Ba Huynh
*Assistant Examiner*—Enrique W Iturralde
(74) *Attorney, Agent, or Firm*—Ronald E. Prass, Jr..; Prass LLP

(57) ABSTRACT

A page exception icon is provided for programming a page exception during a document processing job. The page exception icon is pre-programmed by selecting at least one document job processing parameter from a plurality of document job processing parameters and storing the document job processing parameter in association with a name provided for the page exception icon. The page exception icon can be dragged and dropped onto objects representing pages of a document processing job to perform a page exception in accordance with the document job processing parameters pre-programmed for the page exception icon.

15 Claims, 3 Drawing Sheets

METHOD FOR ENABLING EASE OF USE WITH PAGE EXCEPTION PROGRAMMING

BACKGROUND

1. Field of the Technology:

The present disclosure relates to a method, system and computer program product for configuring document management systems. More particularly, the present disclosure relates to a method, system and computer program product for pre-programming a page exception icon that can be used to apply a page exception on at least one page in accordance with page exception parameters.

2. Description of the Prior Art:

Graphical User Interfaces ("GUIs") are used to display and configure parameter values for processing of documents, such as a page exception programming. A page exception is the application of one or more specified document job processing parameters to one or more specified pages within a document processing job. A document processing job is the input of a document to a system for processing, such as for printing and/or finishing. Currently to program a page exception, a user opens a GUI associated with a target document processing system and selects a tab within the GUI to view and configure document job processing parameters. The user selects a combination of the document job processing parameters and identifies one or more pages on which the pages exception processing is to be performed. This process is repeated until all page exceptions are performed. The job is then submitted for print.

This type of page exception programming is tedious, time consuming and prone to error for document processing jobs involving numerous pages and when there are numerous different types of page exceptions to be performed. For example, the copy quality on different pages may need to differ. In known document management systems, the copy quality may be programmed as a page exception for particular pages by individually selecting each of the pages to be associated with particular copy quality parameters and then specifying the copy quality for the selected group. However, selection errors may not be discovered until the reproduction job is completed and significant expense entailed in the reprogramming of the job.

Accordingly, there is a need for a method, system and computer program product for programming a page exception. There is a need for the method, system and computer program product for pre-programming a page exception icon. There is a need for the page exception icon to perform a page exception in accordance with document job processing parameters pre-programmed for the page exception icon.

SUMMARY OF DISCLOSURE

According to embodiments of the present disclosure, a method, system and a computer program product for programming a page exception are provided. A GUI is provided where a page exception can be programmed by the selection of document job processing parameters on the GUI. The combination of selected document job processing parameters for performing a page exception can be stored as a pre-programmed page exception icon. A page exception icon is on screen symbol that represents a page exception that can be performed on one or more pages. The pre-programmed page exception icon can be dragged to, and dropped on, one or more objects representing respective pages of a document processing job to perform a page exception to the one or more pages in accordance with the document job processing parameters stored for the pre-programmed page exception icon. A pre-programmed page exception icon can be saved as a model for the creation of a subsequent pre-programmed page exception icon. The method can be performed on a system including, but not limited to, a workstation a photocopier, a xerographic photocopier, a paper handler, a document finisher, a scanner, a printer, or a fax machine.

In an embodiment of the present technology, a method of pre-programming a page exception icon operable to perform a page exception on at least on page of a document processing job is provided. The method includes selecting at least one document job processing parameter from a plurality of document job processing parameters, providing a name related to the at least one document job processing parameter, and storing the at least one document job processing parameter as a pre-programmed page exception icon. The pre-programmed page exception icon is operable to perform a page exception in accordance with the at least one document job processing parameter.

In an aspect of the present technology, the method includes selecting a page exception option, wherein a plurality of objects representing pages in the document processing job are displayed. The selection of the page exception option can include displaying the pre-programmed page exception icon.

In an aspect of the present technology, the method includes dragging and dropping the pre-programmed page exception icon on at least one of the plurality of objects representing pages in the document processing job.

In an aspect of the present technology, the method includes performing a page exception on the at least one of the plurality of objects representing the document processing job in accordance with the at least one document job processing parameter.

BRIEF DESCRIPTION OF THE DRAWINGS

The above described features and advantages of the present disclosure will be more fully appreciated with reference to the detailed description and appended figures in which.

DETAILED DESCRIPTION OF DISCLOSURE

The subject matter of the present disclosure is now described more fully hereinafter with reference to the accompanying drawings that show exemplary embodiments of the present technology. The subject matter of the present disclosure, however, may be embodied in many different forms and should not be construed as limited to the embodiments set forth herein. Appropriately, these embodiments are provided so that this disclosure will be thorough and complete, and will fully convey the scope of the disclosed subject matter.

According to embodiments of the present disclosure, a method, system and a computer program product for programming a page exception are provided. A page exception is one or more specified document job processing parameters applied to one or more specified pages within a document processing job. A document processing job is the input of a document to a system for processing, such as for printing and/or finishing. A GUI is provided where a page exception can be programmed by the selection of document job processing parameters on the GUI. A combination of selected document job processing parameters can be stored as a pre-programmed page exception icon. A page exception icon is on screen symbol that represents a page exception. The pre-programmed page exception icon can be associated with one or more pages to apply a page exception in accordance with the selected document job processing parameters to the one or more pages. A pre-programmed page exception icon can be saved as a model for the creation of a subsequent pre-programmed page exception icon. The method can be performed on a system including, but not limited to, a workstation, a photocopier, a xerographic photocopier, a paper handler, a document finisher, a scanner, a printer, or a fax machine.

In an embodiment of the present technology, a page exception icon can be opened by double clicking to see the document job processing parameters programmed for the page exception icon. In an embodiment of the present technology, the page exception icon can be opened to update the document job processing parameters stored for the page exception icon. The pre-programming page exception icon enables a user to clearly and quickly apply a page exception to a plurality of pages in a document processing job and reduce the number of errors that occur during the assignment page exceptions.

Figure 1:
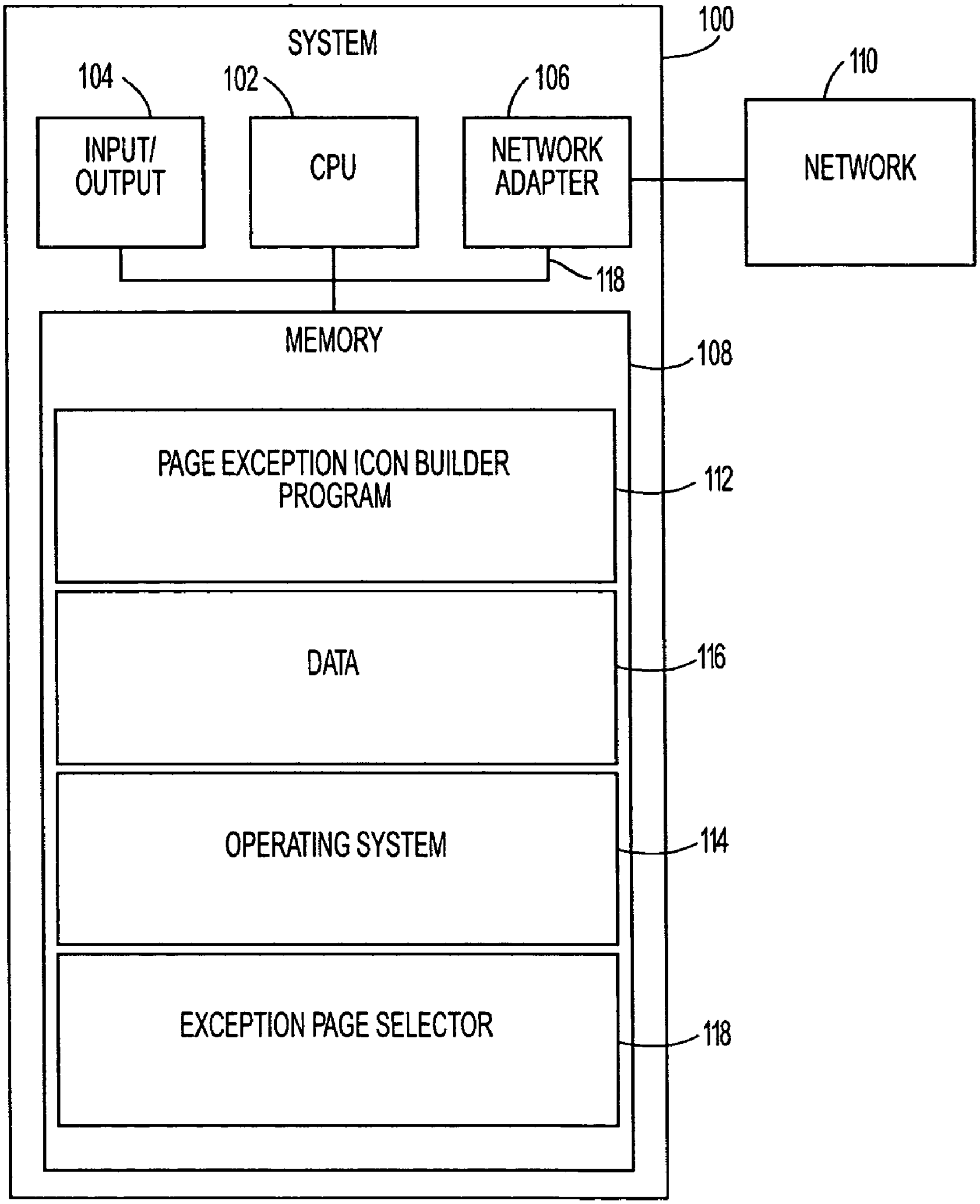
FIG. 1 depicts an exemplary functional block diagram of a device in which the present technology can find application.

FIG. 1 is an exemplary block diagram of a system 100 in which the present technology may be implemented. System 100 can be any one or a combination of a copier, printer, and other reproduction system. The user system 100 may include CPU 102, connected by a bus 118 or other suitable interface means to system memory 108. In the FIG. 1 embodiment of the present disclosure, CPU 102 is a microprocessor, such as an INTEL PENTIUM® or AMD® processor, but may be any processor that executes program instructions in order to carry out the functions disclosed herein. The network adapter 106 provides an interface between the system 100 and a network 110, such as the Internet.

The user system 100 can also include input/output circuitry 104 and network adapter 106. Input/output device circuitry 104 enables interaction with and execution of instructions by user system 100 as directed by a user and output in response to executed instructions. The input/output circuitry 104 provides an interface for the selection of parameters for operations including, but not limited to, pre-programming of a page exception icon, the assignment of a page exception to one or more pages of a document processing job using the page exception icon and outputting a document processing job in accordance with the techniques disclosed by the present disclosure. The input/output circuitry 104 includes input devices, such as trackball, mice, touchpads and keyboards, and output devices, such as printers and monitors.

In an embodiment of the present technology, output devices include one or more controllers for regulating the application of inks or toners to paper for the generation of documents as well as the control of papers moving through output devices for proper registration in multi-channel color printing and the like. Output devices can include one or more discharge areas where finished documents are deposited by output devices for retrieval.

In an embodiment of the present technology, a controller within output devices manages device color profiles for color printing. These device color profiles are used to convert device independent color space coordinates to device dependent color space coordinates as is well known. In previously known systems, a device dependent color space profile is applied to a plurality of contiguous pages within a document or to an entire printing job. A controller within printer module 24 may also be used for trapping, anti-aliasing, and black overprinting or other known document job processing parameters. Trapping parameters for print jobs include trap widths, overprint specifications, choke information, spread information, bleed information, and trap zones. Anti-aliasing and black overprinting are also document job processing parameters for print jobs that are well-known within the industry.

As shown in FIG. 1, the various components of the user system 100 communicate through a bus or similar architecture 118. Accordingly, systems memory 108 is disposed in communication with CPU 102 through bus 118. Systems memory 108 includes page exception icon builder program 112, exception page selector 118, operating system 114 and data 116. Operating system 114 provides overall system functionality. The page exception icon builder program 112 enables pre-programming of a page exception icon in accordance with the present disclosure as discussed in detail herein below. Exception page selector 118 enables the assignment of a page exception to one or more pages of a document processing job using the page exception icon in accordance with the present disclosure as discussed in detail herein below. In an embodiment of the present technology, page exception icon builder program 112 and exception page selector 118 are stand alone applications. In an embodiment of the present technology, page exception icon builder program 112 and exception page selector 118 are applets with a print dialogue. In an embodiment of the present technology, page exception icon builder program 112 and exception page selector 118 may also be written in other computer programming languages, such as C, Javascript, a document description language such as Postscript, or the like. The page exception icon can be pre-programmed by the selection of parameters associated with one or more document processing functions. The parameters that can be selected include, but are not limited to, print color anti-aliasing, trapping, black overprinting, duplex or simplex reproduction, paper size and other known printing parameters.

Figure 2:
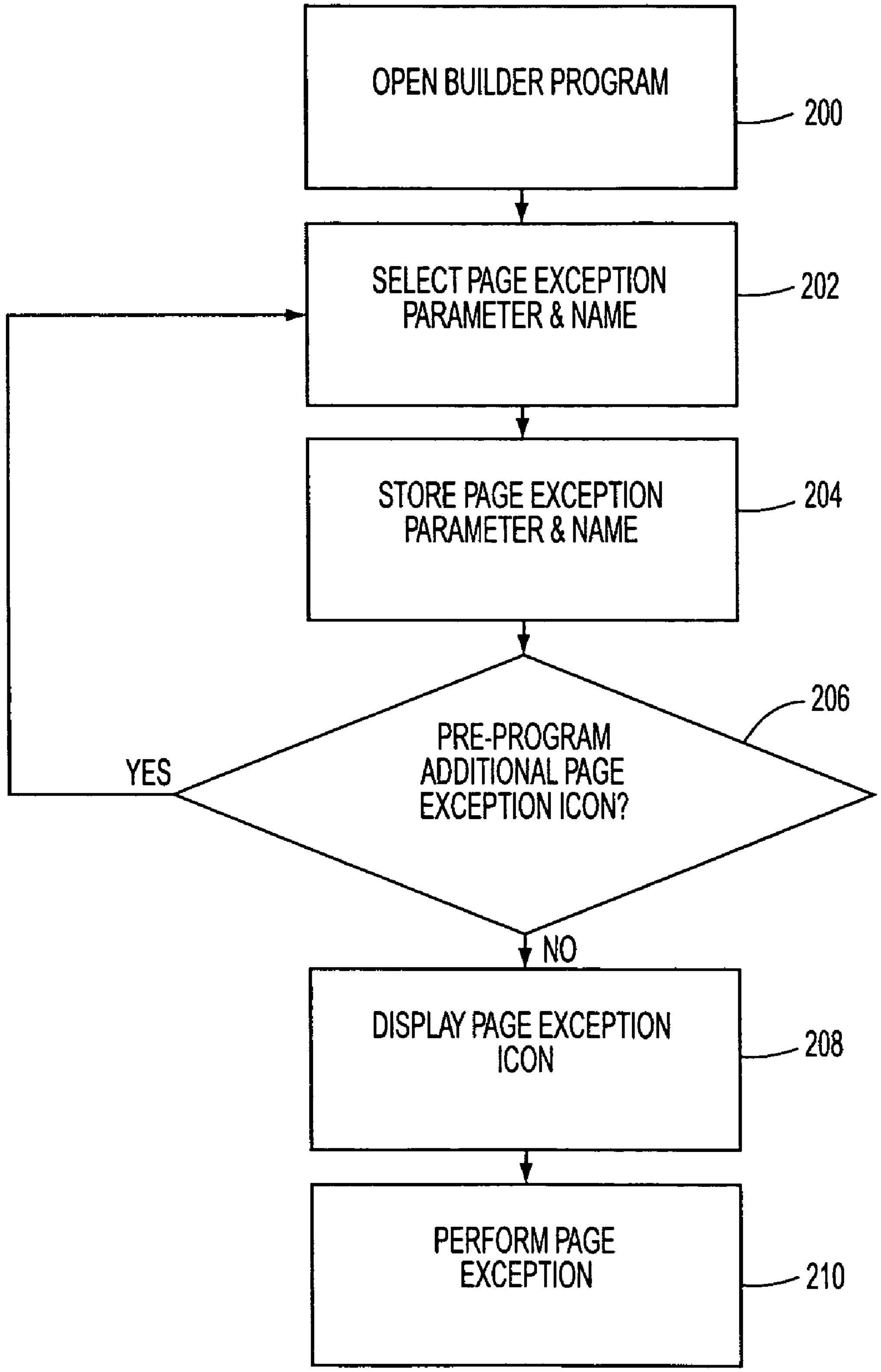
FIG. 2 depicts an exemplary flow diagram of a method for performing preprogramming a page exception icon in accordance with the present disclosure.

FIG. 2 depicts an exemplary flow chart of a method of pre-programming a page exception icon in accordance with the disclosure. In the FIG. 2 embodiment of the present disclosure, the method begins at step 200. At step 200, a user opens the page exception icon builder program. The application may be opened through the input of a file name or the selection of an application icon.

At step 202, the user is prompted to select at least one document job processing parameter from a plurality of document job processing parameters and enter a page exception title. The page exception title will appear on the page exception icon and will be the user's way of identifying the page exception icon. In an embodiment of the present technology, the document job processing parameters correspond to basic reprographic, scanning, or printing functions. In an embodiment of the present technology, the document job processing parameters correspond to the extent of the available document processing job functions available on a reprographic, printing, or scanning system or a family of systems. At step 204, the at least one document job processing parameter is stored and associated the name provided during step 202. At step 206, it is determined whether an additional page exception icon is to be programmed. If so, the method returns to step 202. Otherwise, the method goes to step 208.

At step 208, the page exception icon is displayed. In an embodiment of the present technology, the page exception icon is provided on the a user's desktop. In an embodiment of the present technology, the page exception icon is provided within the page exception portion of the print application dialog. The page exception icon will be displayed when a user selects the Page Exception option from the document processing functions available on the system. In an embodiment of the present technology, the selection of the Page Exception option initiates the display of the pages of a document processing job. In an embodiment of the present technology, the pages can be displayed a objects representing the pages in the document processing job, such as in a print preview or as thumbnails.

At step 210, a page exception using the page exception icon is performed. The parameters for the page exception icon can be correlated to one or more pages. In an embodiment of the present invention, the document job processing parameters are correlated to a page at imaging time before the document processing job is sent to a system that performs document processing. The pages that are correlated with document job processing parameters are characterized as being associated with the document job processing parameters. The page exception is then applied to the correlated pages in accordance with the document job processing parameters by the system. In an embodiment of the present invention, the document job processing parameters are correlated and applied to a page at document processing time by a system that perform document processing. The system determining whether document job processing parameters are to be applied to the page during printing. If exception parameters are to be applied, the system alters its operation to conform to the specified exception parameters. Once the parameters are applied to the page, the system then returns the operating conditions to those that existed before the page exceptions parameter were applied, if the next page is not correlated with document job processing parameters.

In an embodiment of the present technology, the page exception icon is dragged and dropped onto the one or more of the objects representing the pages in the document processing job to correlated document job processing parameters to pages. In an embodiment of the present technology, the objects representing the pages are thumbnail images of the pages. In an embodiment of the present technology, a series of thumbnails can be highlighted and the page exception icon dragged and dropped on at least on of the highlighted thumbnails to apply the page exception document processing parameters stored for the page exception icon with the pages represented by the highlighted thumbnails. The highlighting could be done using a click a drag approach or a click, hold down the shift button and click method. When the association is completed a visual designation of association is attached to the thumbnail, such as the page exception title is shown on the bottom of the thumbnail. In an embodiment of the present technology, when an association is made, the job ticket, such as a XPIF file, is appended to include the page exception data for the designated page(s).

In an embodiment of the present technology, an attempt to use a page exception icon on a system not having the document processing job functions stored for the page exception icon will trigger a warning. The warning can be audible or visible. In an embodiment of the present technology. If the user insists on using the icon, the invalid information will not be used within the page exception.

Figure 3:
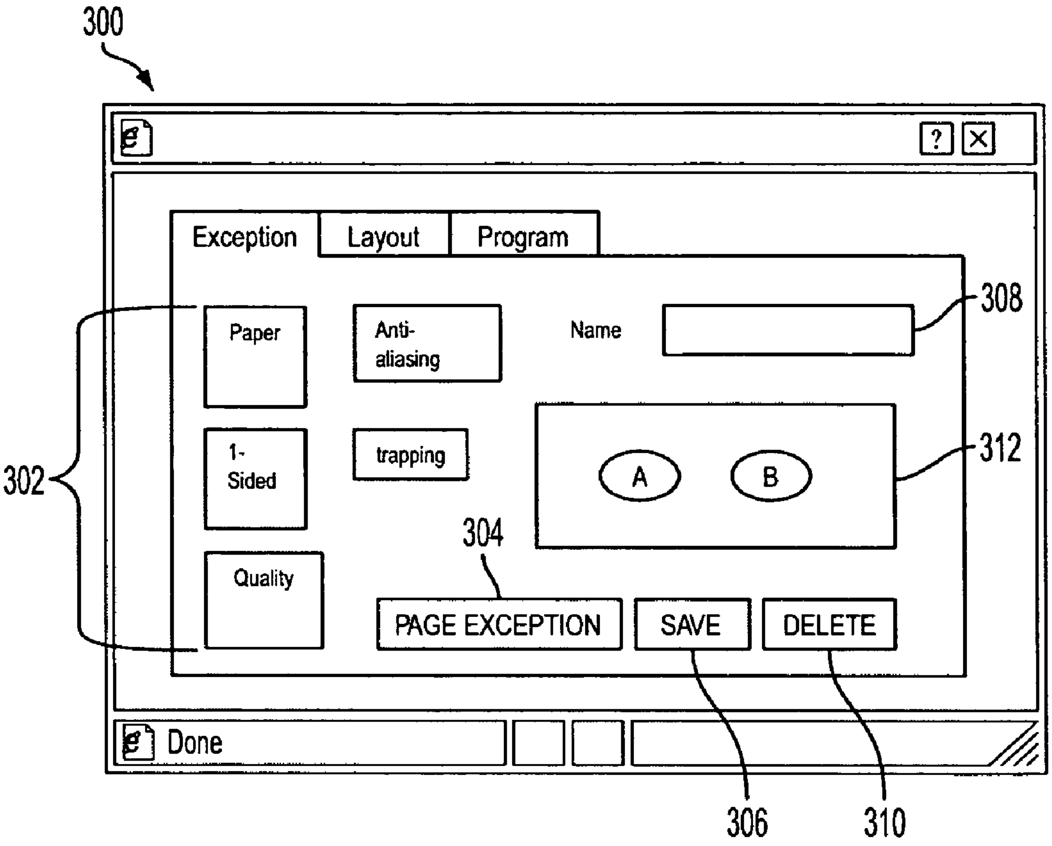
FIG. 3 depicts an exemplary GUI for pre-programming a page exception icon in accordance with the present disclosure.
Figure 4:
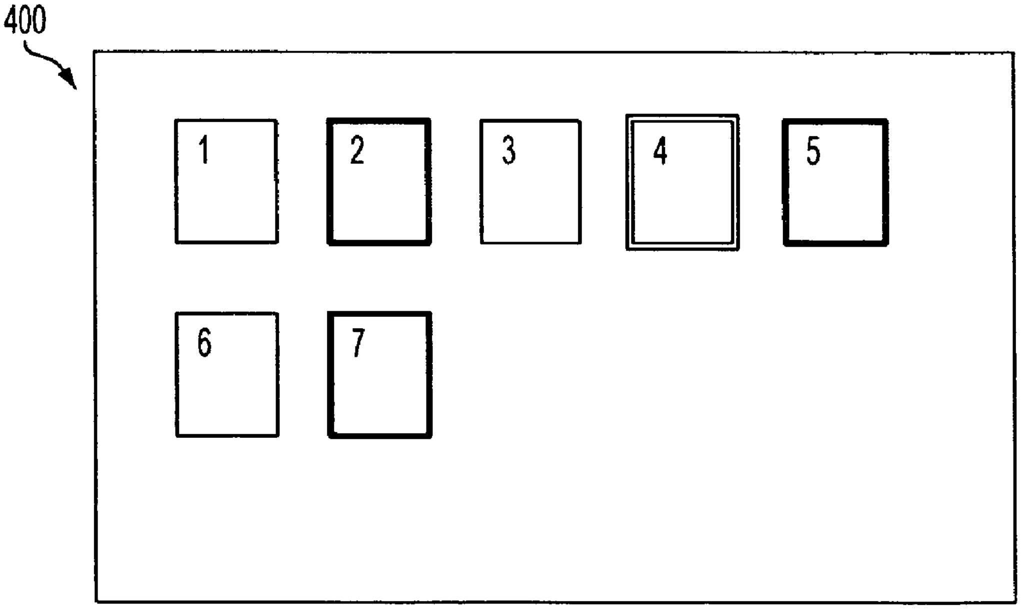
FIG. 4 depicts an exemplary GUI for applying a page exception to one or more pages in a document job in accordance with the present disclosure.

FIGS. 3 and 4 depict exemplary GUIs for pre-programming a page exception icon and applying a page exception to one or more pages in accordance with document job processing parameters of a page exception icon. In the FIG. 3 embodiment of the present technology, a print application dialog 300 is shown. In the FIG. 3 embodiment of the present technology, print application dialogue includes icons 302, page exception option 304, save option 306, name textbox 308, delete option 310, and window 312. Document job processing icons 302 allow access to document job processing parameters associated with the icon. Page exception option 304 initiates a page exception. Save option 306 stores at least one selected parameter with the name specified in name textbox 308. Name textbox 308 is for entry of a title for a page exception icon that is operable to apply at least one selected document processing parameter. In an embodiment of the present technology, print application dialogue can display document processing parameters for different types of document processing functions. Delete option 310 allows for deleting a stored page exception icon. Window 312 displays stored pre-programmed page exception icons A and B. The pre-programmed page exception icons stored in window 312 can be applied to one or more objects representing pages of a document processing job.

In the FIG. 4 embodiment of the present technology, a document processing preview window 400 is shown. In the FIG. 4 embodiment of the present technology, preview window 400 displays objects representing the pages of a document processing job. In an embodiment of the present technology, the document processing preview window is launched upon the selection of the page exception option 304 shown in FIG. 3. The representations include an indicator of the particular page represented in the document processing job. The page exception icons shown in window 312 of FIG. 3 can be dragged and dropped onto one or more of the representations of pages in the document processing job. As shown in FIG. 4, pages 2, 5 and 7 have been designated to receive a page exception associated with a first pre-programmed page exception icon, such as page exception icon A shown in window 312 of FIG. 3, and page 4 has been designated to receive a page exception associated with a second pre-programmed page exception icon, such as page exception icon B shown in window 312 of FIG. 3.

While specific embodiments of the present disclosure have been illustrated and described, it will be understood by those having ordinary skill in the art that changes can be made to those embodiments without departing from the spirit and scope of the disclosure.

What I claim is:

1. A method of creating a pre-programmed page exception icon operable to perform a page exception on at least one page of a document processing job, the method comprising:

selecting at least two document job processing parameters from a plurality of document job processing parameters;

creating a pre-programmed page exception icon that represents the at least two document job processing parameters, wherein the pre-programmed page exception icon is operable to perform the page exception in accordance with the at least two document job processing parameters;

assigning a name to the pre-programmed page exception icon; and storing the created pre-programmed page exception icon and the assigned name of the pre-programmed page exception icon so that it is presented on a graphical user interface that permits selection of the pre-programmed page exception icon for use on future document processing jobs.

2. The method according to claim 1, wherein the plurality of document job processing parameters include at least one of copy quality, print color, anti-aliasing, trapping, black overprinting, duplex reproduction, simplex reproduction, paper type, and paper size.

3. The method according to claim 1, further comprising:

selecting the pre-programmed page exception icon, wherein the selected pre-programmed page exception icon is operable to perform the page exception in accordance with the at least two document job processing parameters.

4. The method according to claim 1, further comprising:

dragging and dropping the pre-programmed page exception icon onto at least one of the plurality of objects representing pages in a document processing job, wherein the dragged and dropped pre-programmed page exception icon is operable to perform the page exception in accordance with the at least two document job processing parameters.

5. The method according to claim 1, wherein the method is performed on a system and the system is one of a workstation, a photocopier, a xerographic photocopier, a paper handler, a document finisher, a scanner, a printer, or a fax machine.

6. A computer-readable medium storing instructions for controlling a computing device for creating a pre-programmed page exception icon operable to perform a page exception on at least one page of a document processing job, the instructions comprising:

selecting at least two document job processing parameters from a plurality of document job processing parameters;

creating a pre-programmed page exception icon that represents the at least two document job processing parameters, wherein the pre-programmed page exception icon is operable to perform the page exception in accordance with the at least two document job processing parameters;

assigning a name to the pre-programmed page exception icon; and storing the created pre-programmed page exception icon and the assigned name of the pre-programmed page exception icon so that it is presented on a graphical user interface that permits selection of the pre-programmed page exception icon for use on future document processing jobs.

7. The computer-readable medium according to claim 6, wherein the plurality of document job processing parameters include at least one of copy quality, print color, anti-aliasing, trapping, black overprinting, duplex reproduction, simplex reproduction, paper type, and paper size.

8. The computer-readable medium according to claim 6, further comprising:

selecting the pre-programmed page exception icon, wherein the selected pre-programmed page exception icon is operable to perform the page exception in accordance with the at least two document job processing parameters.

9. The computer-readable medium according to claim 6, further comprising:

dragging and dropping the pre-programmed page exception icon onto at least one of the plurality of objects representing pages in a document processing job, wherein the dragged and dropped pre-programmed page exception icon is operable to perform the page exception in accordance with the at least two document job processing parameters.

10. The computer-readable medium according to claim 6, wherein the instructions are implemented on a system and the system is one of a workstation, a photocopier, a xerographic photocopier, a paper handler, a document finisher, a scanner, a printer, or a fax machine.

11. A system for pre-programming a page exception icon operable to perform a page exception on at least one page of a document processing job comprising:

a processor operable to execute computer program instructions; and a memory operable to store computer program instructions executable by the processor, the processor performing the steps of:

selecting at least two document job processing parameters from a plurality of document job processing parameters;

creating a pre-programmed page exception icon that represents the at least two document job processing parameters, wherein the pre-programmed page exception icon is operable to perform the page exception in accordance with the at least two document job processing parameters;

assigning a name to the pre-programmed page exception icon; and storing the created pre-programmed page exception icon and the assigned name of the pre-programmed page exception icon in the memory so that it is presented on a graphical user interface that permits selection of the pre-programmed page exception icon for use on future document processing jobs.

12. The system according to claim 11, wherein the plurality of document job processing parameters include at least one of copy quality, print color, anti-aliasing, trapping, black overprinting, duplex reproduction, simplex reproduction, paper type, and paper size.

13. The system according to claim 11, further comprising:

selecting the pre-programmed page exception icon, wherein the selected pre-programmed page exception icon is operable to perform the page exception in accordance with the at least two document job processing parameters.

14. The system according to claim 11, further comprising:

dragging and dropping the pre-programmed page exception icon onto at least one of the plurality of objects representing pages in a document processing job, wherein the dragged and dropped pre-programmed page exception icon is operable to perform the page exception in accordance with the at least two document job processing parameters.

15. The system according to claim 11, wherein the system is one of a workstation, a photocopier, a xerographic photocopier, a paper handler, a document finisher, a scanner, a printer, or a fax machine.

* * * * *